(12) United States Patent
Piotrowski et al.

(10) Patent No.: US 9,352,824 B2
(45) Date of Patent: May 31, 2016

(54) LINE REPLACEABLE, FLY-BY-WIRE CONTROL COLUMN AND CONTROL WHEEL ASSEMBLIES WITH A CENTRALLY CONNECTED LINE REPLACEABLE DISCONNECT AND AUTOPILOT ASSEMBLY

(71) Applicants: Maciej J. Piotrowski, Harwood Heights, IL (US); Steven E. Rickenbrode, Elmhurst, IL (US); Ronald Albin Wilcox, Chicago, IL (US)

(72) Inventors: Maciej J. Piotrowski, Harwood Heights, IL (US); Steven E. Rickenbrode, Elmhurst, IL (US); Ronald Albin Wilcox, Chicago, IL (US)

(73) Assignee: Woodward MPC, Inc., Skokie, IL (US)

( * ) Notice: Subject to any disclaimer, the term of this patent is extended or adjusted under 35 U.S.C. 154(b) by 129 days.

(21) Appl. No.: 14/162,477

(22) Filed: Jan. 23, 2014

(65) Prior Publication Data

US 2015/0203188 A1 Jul. 23, 2015

(51) Int. Cl.
| B64C 13/12 | (2006.01) |
| B64C 13/18 | (2006.01) |
| B64C 13/04 | (2006.01) |
| B64C 13/08 | (2006.01) |
| B64C 13/10 | (2006.01) |

(52) U.S. Cl.
CPC ............... *B64C 13/12* (2013.01); *B64C 13/04* (2013.01); *B64C 13/08* (2013.01); *B64C 13/10* (2013.01); *B64C 13/18* (2013.01)

(58) Field of Classification Search
CPC ........ B64C 13/12; B64C 13/30; B64C 13/04; B64C 13/10; B64C 13/08; B64C 13/18; B64C 13/46; B64C 13/50; B64C 13/503; B64C 19/02
See application file for complete search history.

(56) References Cited

U.S. PATENT DOCUMENTS

| 1,304,420 | A | | 5/1919 | Verner |
| 1,821,581 | A | | 9/1931 | Rosatelli |
| 2,076,088 | A | * | 4/1937 | Malinowski ............ B64C 13/30 244/233 |
| 2,319,285 | A | * | 5/1943 | Amiot ..................... B64C 13/30 244/222 |
| 2,539,753 | A | | 1/1951 | Peterson |
| 3,773,282 | A | | 11/1973 | Sands et al. |
| 4,473,203 | A | | 9/1984 | Barnoin et al. |
| 4,477,043 | A | | 10/1984 | Repperger |
| 5,149,023 | A | | 9/1992 | Sakurai et al. |
| 5,489,830 | A | | 2/1996 | Fernandez |

(Continued)

FOREIGN PATENT DOCUMENTS

| FR | 579283 | 10/1924 |
| WO | WO 95/03212 | 2/1995 |

(Continued)

*Primary Examiner* — Christopher P Ellis
*Assistant Examiner* — Jessica Wong
(74) *Attorney, Agent, or Firm* — Reinhart Boerner Van Deuren P.C.

(57) ABSTRACT

A yoke for controlling the attitude of an aircraft is provided. The yoke includes a chassis, a pitch hub, a roll hub, a support column, a control wheel and a connection arrangement. The pitch hub rotatably mounts to the chassis. The roll hub rotatably mounts to the chassis for motion being generally parallel to the pitch hub. The support column attaches to the pitch hub for rotational motion with the pitch hub relative to the chassis. The control wheel pivotally attaches to the support column for rotational motion about a control wheel pivot axis being generally perpendicular to the pitch and roll hubs. The connection arrangement couples the control wheel to the roll hub and is configured to rotate the roll hub about the roll axis when the control wheel is rotated about the control wheel pivot axis. A system including interconnected yokes is also provided.

16 Claims, 7 Drawing Sheets

(56) References Cited

U.S. PATENT DOCUMENTS

| | | | |
|---|---|---|---|
| 5,806,806 A * | 9/1998 | Boehringer | G05D 1/0077 244/196 |
| 7,229,047 B1 | 6/2007 | Nelson et al. | |
| 8,469,317 B2 | 6/2013 | Burroughs et al. | |
| 2003/0226937 A1 | 12/2003 | Einthoven et al. | |
| 2009/0050748 A1 * | 2/2009 | Ferraz | B64C 13/04 244/234 |

FOREIGN PATENT DOCUMENTS

| | | |
|---|---|---|
| WO | WO 03/081554 | 10/2003 |
| WO | WO 2009/016361 | 2/2009 |

* cited by examiner

LINE REPLACEABLE, FLY-BY-WIRE CONTROL COLUMN AND CONTROL WHEEL ASSEMBLIES WITH A CENTRALLY CONNECTED LINE REPLACEABLE DISCONNECT AND AUTOPILOT ASSEMBLY

FIELD OF THE INVENTION

This invention generally relates to piloting devices such as a control column and wheel assembly, often referred to as yokes.

BACKGROUND OF THE INVENTION

Many aircraft include a yoke for controlling pitch and roll of the aircraft. Originally, the yoke was mechanically connected to the control surfaces of the aircraft such that manipulation of the yoke was opposed by forces required to move the control surfaces of the aircraft.

Newer systems have transitioned to fly-by-wire arrangements where sensors monitor changes in position of the yoke relative to a mechanical ground and convert those changes in position to corresponding control signals that represent desired amounts of change in the control surfaces of the aircraft. The signals are then sent to actuators which manipulate the position of the control surfaces.

Because there is no mechanical linkage between the motion of the yoke and the motion of the control surfaces in fly-by-wire systems, these systems would not provide any force feedback to the pilot as to the extent of the amount of change in control of the aircraft they are inputting. As such, fly-by-wire systems incorporate force feedback systems that provide force feedback to the yoke to provide some physical representation of the control surfaces of the aircraft and the degree of manipulation thereof.

Prior art force feedback systems often used complex parts, lots of parts and were often very large or spread out away from the yoke. This made the yoke more complex, more expensive and less accurate. This also made maintenance and replacement of the yoke difficult and not line replaceable.

The present invention relates to improvements in the art relating to yokes and yoke systems that have multiple yokes that have roll and pitch operations coupled.

BRIEF SUMMARY OF THE INVENTION

In one embodiment, a yoke for controlling the attitude of an aircraft is provided. The yoke includes a chassis, a pitch hub, a roll hub, a support column, a control wheel and a connection arrangement. The pitch hub is rotatably mounted to the chassis for motion about a pitch axis. The roll hub is rotatably mounted to the chassis for motion about a roll axis being generally parallel to the pitch axis. The support column is attached to the pitch hub for rotational motion about the pitch axis with the pitch hub relative to the chassis. The control wheel is pivotally attached to the support column proximate a first end of the support column for rotational motion about a control wheel pivot axis being generally perpendicular to the pitch axis and roll axis. The connection arrangement couples the control wheel to the roll hub and is configured to rotate the roll hub about the roll axis when the control wheel is rotated about the control wheel pivot axis.

In one embodiment, the yoke further includes a pitch centering/feel spring cartridge operably coupled to the pitch hub for providing force feedback to the support column and oppose motion about the pitch axis. The yoke further includes a roll centering/feel spring cartridge operably coupled to the roll hub for providing force feedback to the control wheel and oppose motion of the roll hub about the roll axis.

In one embodiment, the pitch and roll centering/feel spring cartridges are bi-directional spring cartridges.

In one embodiment, the yoke includes a pitch clevis fixedly connected to the pitch hub and extending radially outward from the pitch axis. The pitch clevis connects the pitch centering/feel spring cartridge to the pitch hub. A first end of the pitch centering/feel spring cartridge is attached to the pitch clevis at a location spaced away from the pitch axis. A second end of the pitch centering/feel spring cartridge, opposite the first end, is pivotally attached to the chassis but linearly grounded thereto. The yoke also includes a roll clevis fixedly connected to the roll hub and extending radially outward from the roll axis. The roll clevis connects the roll centering/feel spring cartridge to the roll hub. A first end of the roll centering/feel spring cartridge is attached to the roll clevis at a location spaced away from the roll axis. A second end of the roll centering/feel spring cartridge, opposite the first end, is pivotally attached to the chassis but linearly grounded thereto.

In one embodiment, the yoke includes a pitch damper pivotally connected at a first end to the pitch clevis and pivotally connected at a second end to the chassis but linearly grounded thereto. The yoke also includes a roll damper pivotally connected at a first end to the roll clevis and pivotally connected at a second end to the chassis but linearly grounded thereto.

In one embodiment, the pitch and roll centering/feel spring cartridges are identical and the pitch and roll dampers are identical.

In one embodiment, the pitch and roll centering/feel spring cartridges are identical except for springs thereof; and wherein the pitch and roll dampers are identical except for gating or fluids thereof.

In one embodiment, the support column is pivotally attached to the pitch hub at a hinge having an axis of rotation that is generally parallel to the pitch axis. The yoke further includes a tension/compression force sensor connected at one end to the support column and at a second end to the pitch hub. The force sensor is offset from the hinge.

In one embodiment, the connection arrangement includes a drum, a cable and first and second pulleys. The drum is attached to the control wheel for rotation about the control wheel pivot axis with the control wheel. The cable has first and second ends operably attached to the roll hub and a central portion engaged with the drum. The first pulley is carried by the pitch hub. A first portion of the cable between the first end and the central portion engages the first pulley. The second pulley is carried by the pitch hub. A second portion of the cable between the second end and the central portion engages the second pulley.

In one embodiment, the roll hub includes a main body, a first pulley, a second pulley, a scissor clevis and a tension/compression force sensor. The main hub is rotatably supported by the chassis. The first pulley is rotatably attached to the main hub for rotation about the main hub. The first pulley is attached to the first end of the cable such that tension in the cable applied to the first end causes the first pulley to rotate about the roll axis in a first direction. The second pulley is rotatably attached to the main hub for rotation about the main hub. The second pulley is attached to the second end of the cable such that tension in the cable applied to the second end causes the second pulley to rotate about the roll axis in a second direction, opposite the first direction. The first and second pulleys are fixedly coupled together such that the first and second pulleys rotate together about the roll axis in both the first and second direction. The scissor clevis includes a first portion extending radially outward from the roll axis and that is fixedly attached to the first and second pulleys for rotation about the roll axis with the first and second pulleys. The first portion has a connection end spaced radially outward from the roll axis. The scissor clevis has a second portion extending radially outward from the roll axis and that is fixedly attached to the main hub for rotation about the roll axis with the main hub. The second portion has a connection end spaced radially outward from the roll axis. The tension/compression force sensor is connected at a first end to the connection end of the first portion of the scissor clevis and is connected at a second end to the connection end of the second portion of the scissor clevis.

In one embodiment, the chassis; pitch hub, roll hub; support column; control wheel; connection arrangement; pitch and roll centering/feel spring cartridges; and pitch and roll dampers form a complete line replaceable unit.

In another embodiment, a yoke system for controlling the attitude of an aircraft is provided. The system includes a first and second yokes and a pitch and torque tube coupling the first and second yokes. Each yoke includes a chassis, a pitch hub, a roll hub, a support column, a control wheel and a connection arrangement. The pitch hub is rotatably mounted to the chassis for motion about a pitch axis. The roll hub is rotatably mounted to the chassis for motion about a roll axis being generally parallel to the pitch axis. The support column is attached to the pitch hub for rotational motion about the pitch axis with the pitch hub relative to the chassis. The control wheel is pivotally attached to the support column proximate a first end of the support column for rotational motion about a control wheel pivot axis being generally perpendicular to the pitch axis and roll axis. The connection arrangement couples the control wheel to the roll hub and is configured to rotate the roll hub about the roll axis when the control wheel is rotated about the control wheel pivot axis. The pitch torque tube operably couples and transmits torque between the pitch hubs of the first and second yokes for coordinated rotational motion. The roll torque tube operably couples and transmits torque between the roll hubs of the first and second yokes for coordinated rotational motion.

In one embodiment, each yoke and each torque tube are individual line replaceable units.

In one embodiment, the system includes a pitch autopilot feedback arrangement. The pitch autopilot feedback arrangement includes a pitch actuator operably coupled to the pitch torque tube and configured to operably drive the pitch hubs of the first and second yokes to manipulate the support columns of the first and second yokes to provide pitch autopilot visual feedback. The system also includes a roll autopilot feedback arrangement. The autopilot feedback arrangement includes a roll actuator operably coupled to the roll torque tube and configured to operably drive the roll hubs of the first and second yokes to manipulate the control wheels of the first and second yokes to provide roll autopilot visual feedback.

In one embodiment, the system includes a pitch disconnect device having a disconnected state. In the disconnected state, the pitch disconnect device is configured to mechanically disconnect the pitch hub of the first yoke from the pitch hub of the second yoke so that the support columns of the first and second yokes can be manipulated independently from one another. The system also includes a roll disconnect device having a disconnected state. In the disconnected state, the roll disconnect device is configured to mechanically disconnect the roll hub of the first yoke from the roll hub of the second yoke so that the control wheels of the first and second yokes can be manipulated independently from one another.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
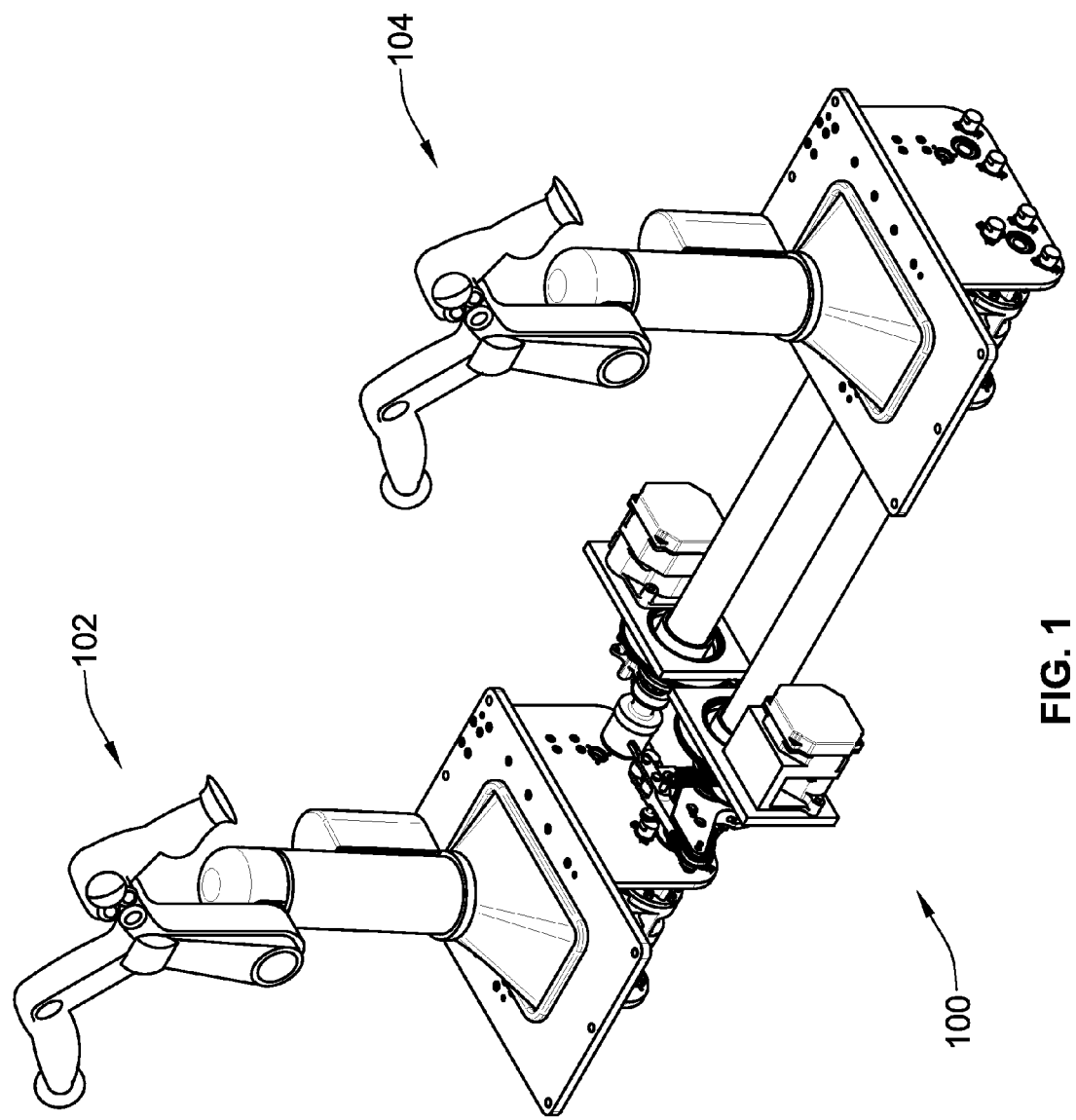
FIG. 1 is a top perspective illustration of a yoke system for controlling the attitude of an aircraft.

FIG. 1 illustrates a yoke system 100 for controlling the attitude of an aircraft (pitch and roll) according to an embodiment of the invention. The yoke system 100 includes a pair of yokes 102, 104 which allow for two pilots to control the flight of the aircraft. The two yokes 102, 104 are coupled to one another such that pilot input to one yoke causes a corresponding change in the other yoke. The two yokes 102, 104 are line replaceable units (LRU's) such that the components thereof can be easily removed and installed into a cockpit of an aircraft.

The yokes 102, 104 are generally fly-by-wire yokes such that the yokes 102, 104 are not directly connected to the control surfaces of the aircraft, such as by cables or shafts. Instead, the yokes 102, 104 have sensors that sense the motion of the yokes 102, 104 and convert that sensed motion into control signals for controlling actuators that are coupled to the control surfaces of the aircraft.

Figure 2:
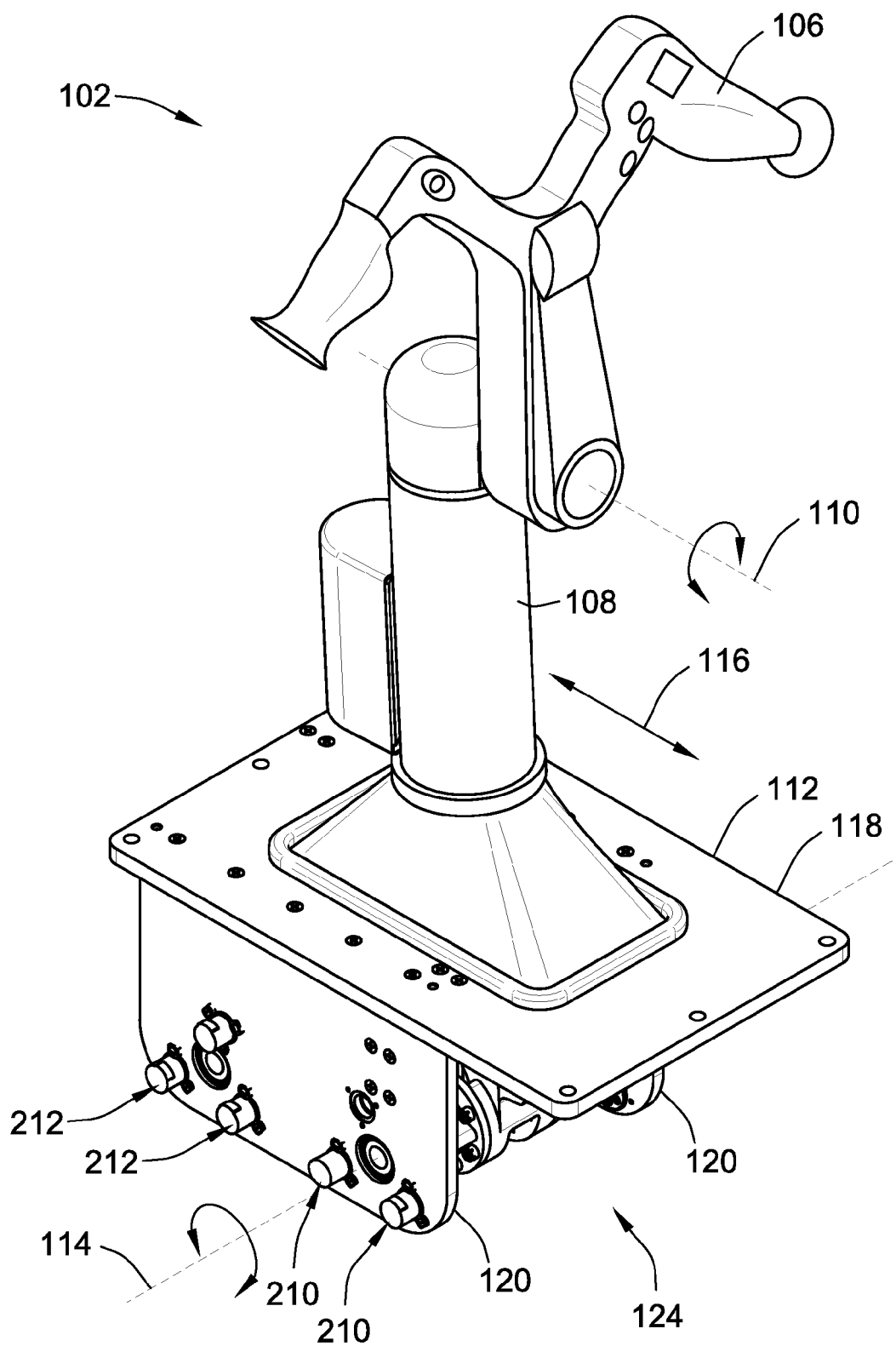
FIG. 2 is a top perspective illustration of one of the yokes of the yoke system of FIG. 1.

FIG. 2 illustrates one of the two yokes, and particularly yoke 102. The two yokes are substantially identical and the details that are similar between the two yokes will be described with regard to yoke 102. However, it will be assumed that the same features are present in a substantially similar manner for the other yoke 104 of the yoke system 100.

The yoke 102 includes a control wheel 106 pivotally attached to the support column 108 proximate a first end of the support column 108. The control wheel is pivotable relative to the support column about a control wheel pivot axis 110 in both a clockwise direction and a counterclockwise direction. The rotation of the control wheel 106 controls the roll of the aircraft.

The support column 108 is operably rotatably attached at an opposite end to a chassis 112 for rotation about a pitch axis 114 when the pilot applies forward or rearward force to the control wheel 110, represented by arrow 116.

The chassis 112 includes a top plate 118 and a pair of parallel side plates 120. The chassis 112 is configured to be bolted to a frame of a cockpit and particularly the floor thereof.

Figure 3:
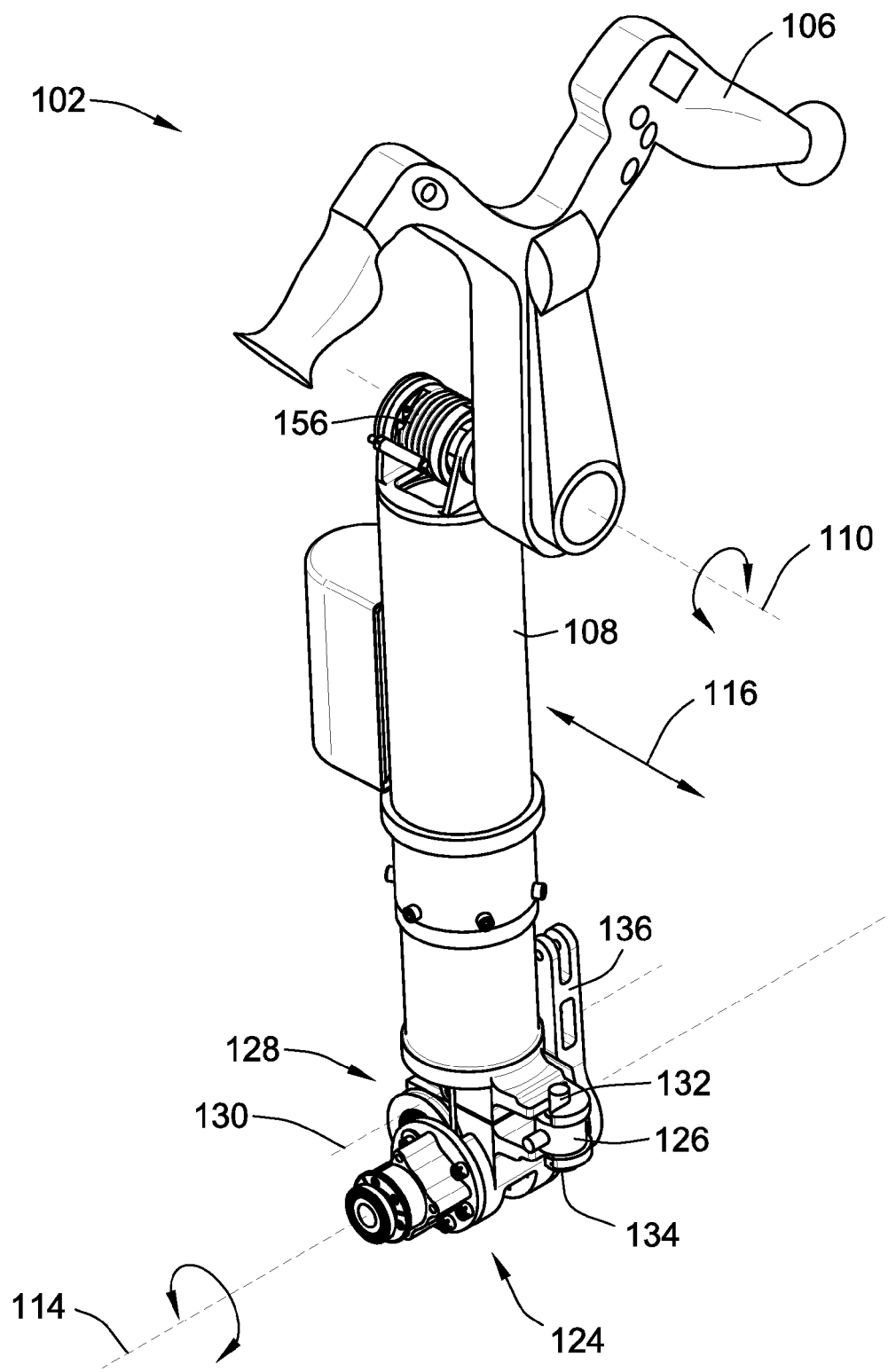
FIG. 3 is a partial illustration of the yoke of FIG. 2 illustrating the pitch hub.

FIG. 3 illustrates a portion of the yoke 102 of FIG. 2. The yoke 102 includes a pitch hub 124 that is rotatably mounted to the chassis 112 (see e.g. FIGS. 2 and 4) for rotation about pitch axis 114. The pitch hub 124 is directly supported on bearings mounted in the chassis 112. More particularly, the pitch hub 124 extends transversely between the opposed side plates 120 of the chassis 112 to which the bearings are mounted. The support column 108 is attached to the pitch hub 124. The force inputs by the pilot, illustrated by arrow 116 in FIG. 2) are transferred to the pitch hub 124.

A pitch tension/compression force sensor 126 monitors the amount of force that the pilot is applying to the control wheel 106. The tension/compression force sensor 126 is a strain gauge-type force sensor. To monitor this force, the support column 108 is directly and rotatably connected to the pitch hub 124 with a hinge 128 for rotation about an axis of rotation 130 that is generally parallel to pitch axis 114. The tension/compression force sensor 126 mounting architecture has the hinge 128 located directly inline of the pitch axis 114 allowing all loads from the column to be transmitted from the grip reference point of the control wheel 106 to the axis of rotation through the tension/compression force sensor.

A first end 132 of the tension/compression force sensor 126 is coupled to the support column 108 while a second end 134 of the tension/compression force sensor 126 is coupled to the pitch hub 124. As such, the tension/compression force sensor 126 will oppose rotation of the support column 108 about axis 130 and that force can be analyzed to determine the amount of force applied by the pilot.

A secondary mechanical reaction point is provided between the pitch hub 124 and the support column 108 in the event of a force sensor failure. The secondary mechanical reaction point limits the amount of relative rotation between the support column 108 and the pitch hub 124 and keeps the two components connected so that the pilot can continue to provide pitch input signals even in the event of failure of the tension/compression force sensor 126.

In alternative embodiments where the pilot input force 116 is not desired to be monitored, a split design such as this is not needed. Instead, the support column 108 and the pitch hub 124 could be could be combined into a single part, i.e. a casting.

Figure 4:
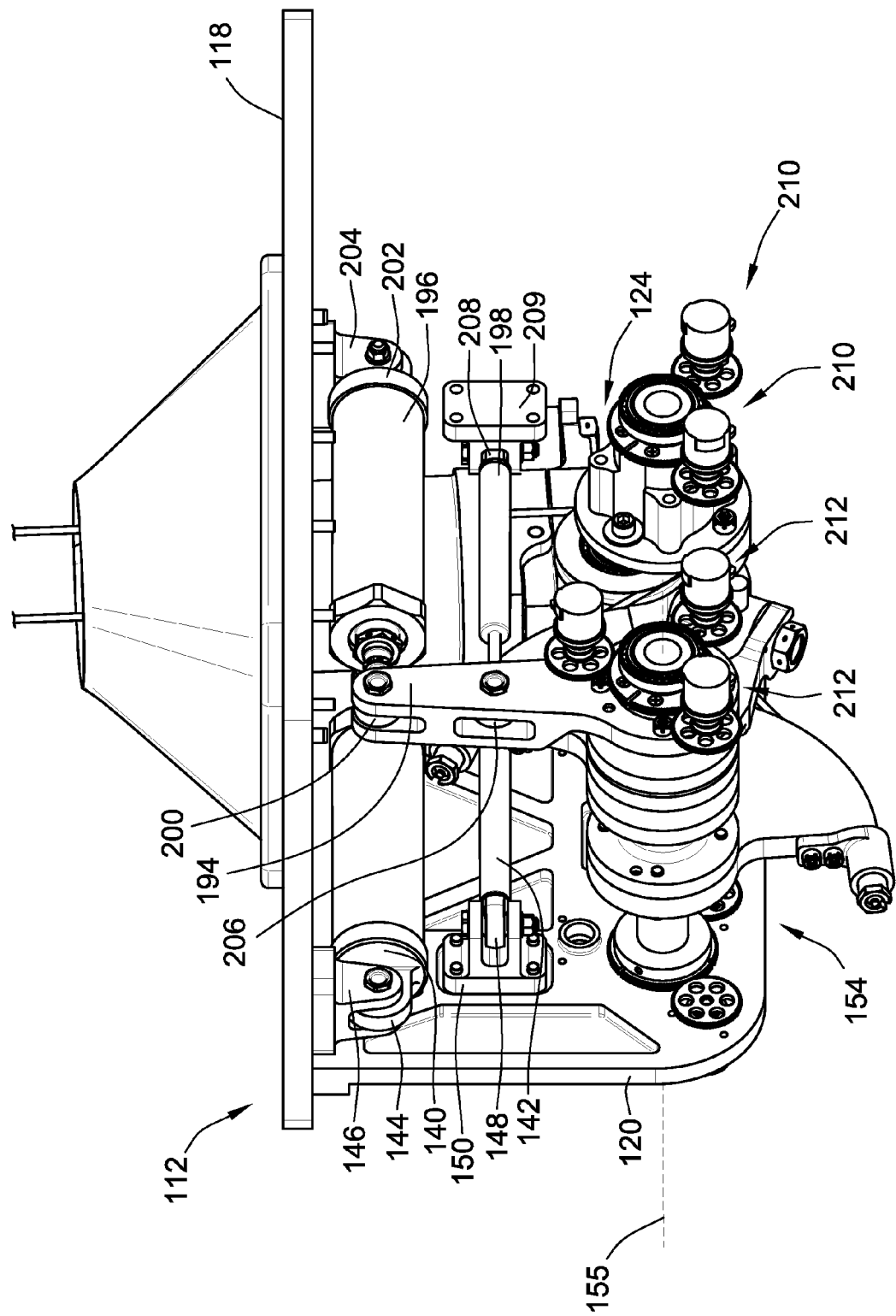
FIG. 4 is a partial illustration of the yoke of FIG. 2 illustrating the force feedback components.

A pitch clevis 136 is fixedly connected to the pitch hub 124 and extends radially outward from the pitch axis 114. Tactile feedback structures are attached to the pitch clevis 136 to provide tactile feedback to the pilot. FIG. 4 illustrates the tactile feedback structures. In the illustrated embodiment, the tactile feedback structures include a pitch centering/feel spring cartridge 140 and a pitch damper 142. Pitch clevis 136 is not illustrated in FIG. 4.

The pitch clevis 136 connects the pitch centering/feel spring cartridge to the pitch hub 124. A first end of the pitch centering/feel spring cartridge 140 is attached to the pitch clevis at a location spaced away from the pitch axis 114. A second end of the pitch centering/feel spring cartridge 140, opposite the first end, is pivotally attached to the chassis 112. The second end of the pitch centering/feel spring cartridge 140 is prevented from translating linearly relative to the chassis 112 (e.g. it is linearly grounded). In FIG. 4, the second end 144 is pivotally connected to a clevis structure 146 that is affixed to the top plate 118 of the chassis.

The pitch centering/feel spring cartridge 140 includes a bi-directional spring therein that opposes motion of the support column 108 in either direction through the pitch clevis 136 and pitch hub 124. The pitch centering/feel spring cartridge 140 thereby defines a home position for the support column 108. Changes in the spring within the pitch centering/feel spring cartridge 140 can adjust the force feedback provided to the pilot during manipulations of the control wheel 106 when adjusting the pitch of the aircraft.

The pitch damper 142 is pivotally connected at a first end to the pitch clevis 136. The pitch damper 142 is pivotally connected at a second end 148 to the chassis 112. More particularly, a clevis structure 150 is fixedly attached to one of the side plates 120 and pivotally connected to the second end 148. The connection of the second end prevents linear motion of the second end 148 relative to the chassis 112.

The pitch damper 142 has internal gating and fluids that can be varied to adjust the dampening provided thereby to adjust the tactile feedback to the pilot.

Figure 5:
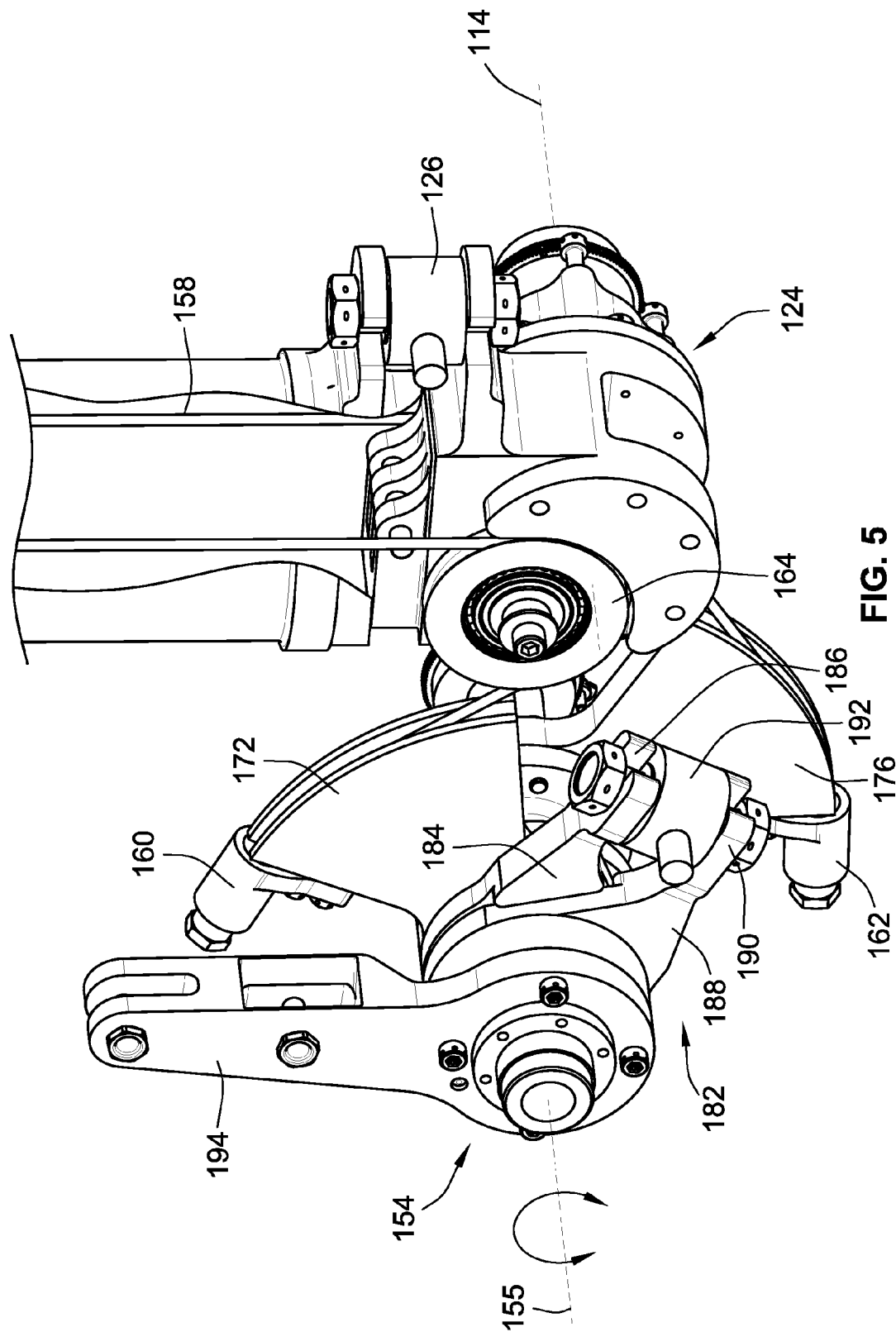
FIGS. 5 and 6 are partial illustrations of the yoke of FIG. 2 illustrating the roll hub components.
Figure 6:
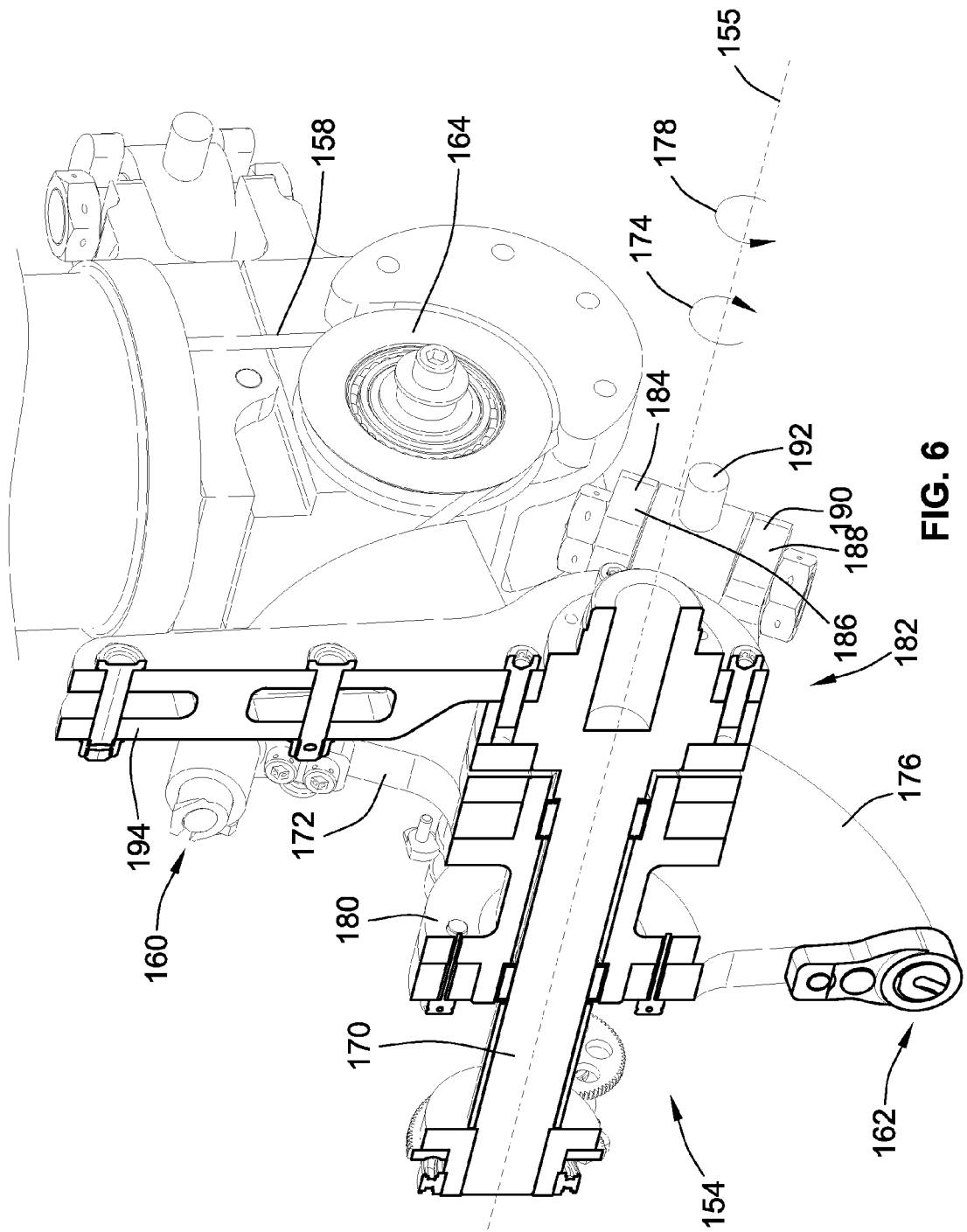

With reference to FIGS. 3 and 5, the yoke 102 includes a connection arrangement that couples the control wheel 106 to a roll hub 154 that rotates about a roll axis of rotation 155 (see FIGS. 5 and 6). The connection arrangement in the illustrated embodiment includes a drum 156 attached to the control wheel 106 for rotation about control wheel pivot axis 110 with the control wheel 106. A cable 158 (which may be provided by one or more cables) has first and second ends 160, 162 that are operably attached to the roll hub 154. The cable 158 has a central portion engaged with drum 156. As such, rotation of the control wheel 106 rotates the drum 156 which creates tension in the cable 158. Depending on which way the control wheel 106 is rotated determines which end 160, 162 of the cable 158 will apply force to the roll hub 154.

The connection arrangement includes a pair of idler pulleys 164 that are carried by the pitch hub 124 and route the cable past the pitch axis 114 to the roll hub 154 that is laterally offset from the pitch hub 124 and support column 108. A first portion of the cable 158 between the first end 160 and the central portion that engages the drum 156 is partially wrapped around and engages one of the idler pulleys 164. A second portion of the cable 158 between the second end 162 and the central portion that engages the drum 156 is partially wrapped around and engages one of the idler pulleys, which is not shown in FIG. 5.

The idler pulleys 164 positioned such that the cable 158 routes directly through the center of rotation of the pitch axis 114. This positioning minimizes any cross-coupling between the pitch and roll axes. Additionally, the cable 158 extends through the support column 108 between drum 156 and idler pulleys 164.

In the illustrated embodiment, the roll hub 154 has a split architecture to allow for monitoring the forces the pilot applies to the control wheel 106 during roll maneuvers.

More particularly, the roll hub 154 includes a main hub 170 that is pivotally mounted between the side plates 120 of the chassis 112. A first sector pulley 172 is rotatably attached to the main hub 170 for rotation about the main hub 170 and roll axis 155. The first sector pulley 172 is attached to the first end 160 of the cable 158 such that tension in the cable 158 applied to the first end 160 causes the first sector pulley 172 to rotate about the roll axis 155 in a first direction, illustrated by arrow 174.

A second sector pulley 176 is rotatably attached to the main hub 170 for rotation about the main hub 170 and roll axis 155. The second sector pulley 176 is attached to the second end 162 of the cable 158 such that tension in the cable 158 applied to the second end 162 causes the second sector pulley 176 to rotate about the roll axis in a second direction, illustrated by arrow 178, opposite the first direction 174.

The first and second sector pulleys 172, 176 are fixedly coupled together by a sector pulley connector shaft 180 that is rotatably supported on the outer surface of main hub 170. As such, the first and second sector pulleys 172, 176 rotate together about the roll axis 155 in both the first and second directions 174, 178.

A scissor clevis 182 forms part of the roll hub 154. The scissor clevis 182 includes a first portion 184 that extends radially outward from the roll axis 155 and that is fixedly attached to the first and second sector pulleys 172, 176 for rotation about the roll axis 155 with the first and second sector pulleys 172, 176. The first portion 184 includes a connection end 186 spaced radially outward from the roll axis 155.

The scissor clevis 182 includes a second portion 188 that extends radially outward from the roll axis 155 and that is fixedly attached to the main hub 170 for rotation about the roll axis 155 with the main hub 170. The second portion 188 includes a connection end 190 spaced radially outward from the roll axis 155.

A tension/compression force sensor 192 is connected at a first end to the connection end 186 of the first portion 184 of the scissor clevis 183 and connected at a second end to the connection end 190 of the second portion 188 of the scissor clevis 182. The tension/compression force sensor 192 monitors the amount of force the pilot is applying to perform roll operations using the control wheel 106.

In alternative embodiments, the force sensor may be eliminated. In such an embodiment, the sector pulley connecting shaft 180 and scissor clevis 182 can be removed. The remaining parts of the roll hub 154 could be combined into a single part, i.e. a casting.

Further, in some embodiments, tension/compression force sensor 192 may be identical as the tension/compression force sensor 126. Further, these sensors could take the form of rotary variable differential transformers (RVDT) or potentiometers.

A roll clevis 194 is fixedly connected to the roll hub 154 and particularly to the main hub 170 such that rotation of the roll hub 154 about roll axis 155 causes rotation of the roll clevis. The roll clevis 194 extends radially outward from the roll axis. Tactile feedback structures are attached to the roll clevis 194 to provide tactile feedback to the pilot during roll maneuvering operations. FIG. 4 illustrates the tactile feedback structures. In the illustrated embodiment, the tactile feedback structures include a roll centering/feel spring cartridge 196 and a roll damper 198, both being attached to roll clevis 194.

The roll centering/feel spring cartridge 196 is substantially identical to the pitch centering/feel spring cartridge 140. In some embodiments, the only different is the spring therein to provide a different level of force feedback.

The roll damper 198 is substantially identical to the pitch damper 142. In some embodiments, the only different is the gating and/or fluid therein to provide a different level of dampening.

The roll clevis 194 connects the roll centering/feel spring cartridge 196 to the roll hub 154. A first end 200 of the roll centering/feel spring cartridge 196 is attached to the roll clevis 194 at a location spaced away from the roll axis 155. A second end 202 of the roll centering/feel spring cartridge 196, opposite the first end 200, is pivotally attached to the chassis 112. The second end 202 of the roll centering/feel spring cartridge 196 is prevented from translating linearly relative to the chassis 112 (e.g. it is linearly grounded). In FIG. 4, the second end 202 is pivotally connected to a clevis structure 204 that is affixed to the top plate 118 of the chassis 112. This connection is substantially identical as that of the pitch centering/feel spring cartridge 140.

The roll centering/feel spring cartridge 196 includes a bi-directional spring therein that opposes motion of the control wheel 106 in either direction through the roll clevis 194 and roll hub 154 and the connection arrangement between the roll hub 154 and control wheel 106. The roll centering/feel spring cartridge 196 thereby defines a home position for the control wheel 106 in the angular direction about control wheel pivot axis 110 (see FIG. 3). Changes in the spring within the roll centering/feel spring cartridge 196 can adjust the force feedback provided to the pilot during manipulations of the control wheel 106 when adjusting the roll of the aircraft.

The roll damper 198 is pivotally connected at a first end 206 to the roll clevis 194. The roll damper 142 is pivotally connected at a second end 208 to the chassis 112. More particularly, a clevis structure 209 is fixedly attached to one of the side plates 120 (not shown in FIG. 4) and pivotally connected to the second end 208. The connection of the second end 208 prevents linear motion of the second end 208 relative to the chassis 112.

The roll damper 198 has internal gating and fluids that can be varied to adjust the dampening provided thereby to adjust the tactile feedback to the pilot.

By using the linearly displaceable spring cartridges for the centering/feel spring cartridges 140, 196, cardioid-shaped cam and follower based architecture is eliminated. As such, complex cam, brackets, follower, bushings/bearings, and a magnitude of hardware are eliminated. The bi-directional spring cartridge provides numerous advantages. This design provides a significant reduction in the number of complex machined parts. A common mounting interface to the chassis and the clevises 136, 194 is provided. The ability to set the spring break-out forces as an individual subassembly. Being a sub-line replaceable unit, allows for reduced remove/replace time and lower maintenance costs. There is a consistent break out force in both directions. There are fewer rolling elements, which lowers friction and reduces hysteresis. Finally, the spring force is easily modified by simply replacing the spring with a spring of a different spring constant.

Further, the linear damper architecture of dampers 142, 198 replaces rotary style dampers, with the linear fluidic dampers. This eliminates the need of gearing or complex four-bar linkages, which may have been different for pitch and roll assemblies. The present design provides several advantages. This design provides a significant reduction in the number of complex machined parts. A common mounting interface is provided for both pitch and roll. Being a sub-line replaceable unit, allows for reduced remove/replace time and lower maintenance costs. There are fewer rolling elements, which lowers friction and reduces hysteresis. Finally, the dampening rate is easily modifiable by changing the damping fluid and/or revising the gaiting inside the damper body.

With reference to FIGS. 2 and 4, the yoke 102 includes a plurality of pitch position sensors 210 and roll position sensors 212.

The pitch position sensors 210 monitor changes in angular position of the pitch hub 124, which are then converted into the control signal to manipulate the control surfaces of the aircraft to adjust the pitch of the aircraft.

The roll position sensors 212 monitor changes in angular position of the roll hub 154, which are then converted into the control signal to manipulate the control surfaces of the aircraft to adjust the roll of the aircraft.

The position sensors 210, 212 are directly mounted to the chassis 112 and particularly one of the side plates 120. The position sensors 210, 212 encircle the corresponding support bearings of each hub 124, 154 in a cluster like arrangement. Each position sensor may have an individual load path by staggering the mounting height and driving each sensor off of a different gear or a different section of a single split gear (for each hub 124, 154). Preferably, there are position sensors 210, 212 on both ends of the hubs 124, 154. The position sensors may all be identical for each axis and have identical mounting interfaces.

Figure 7:
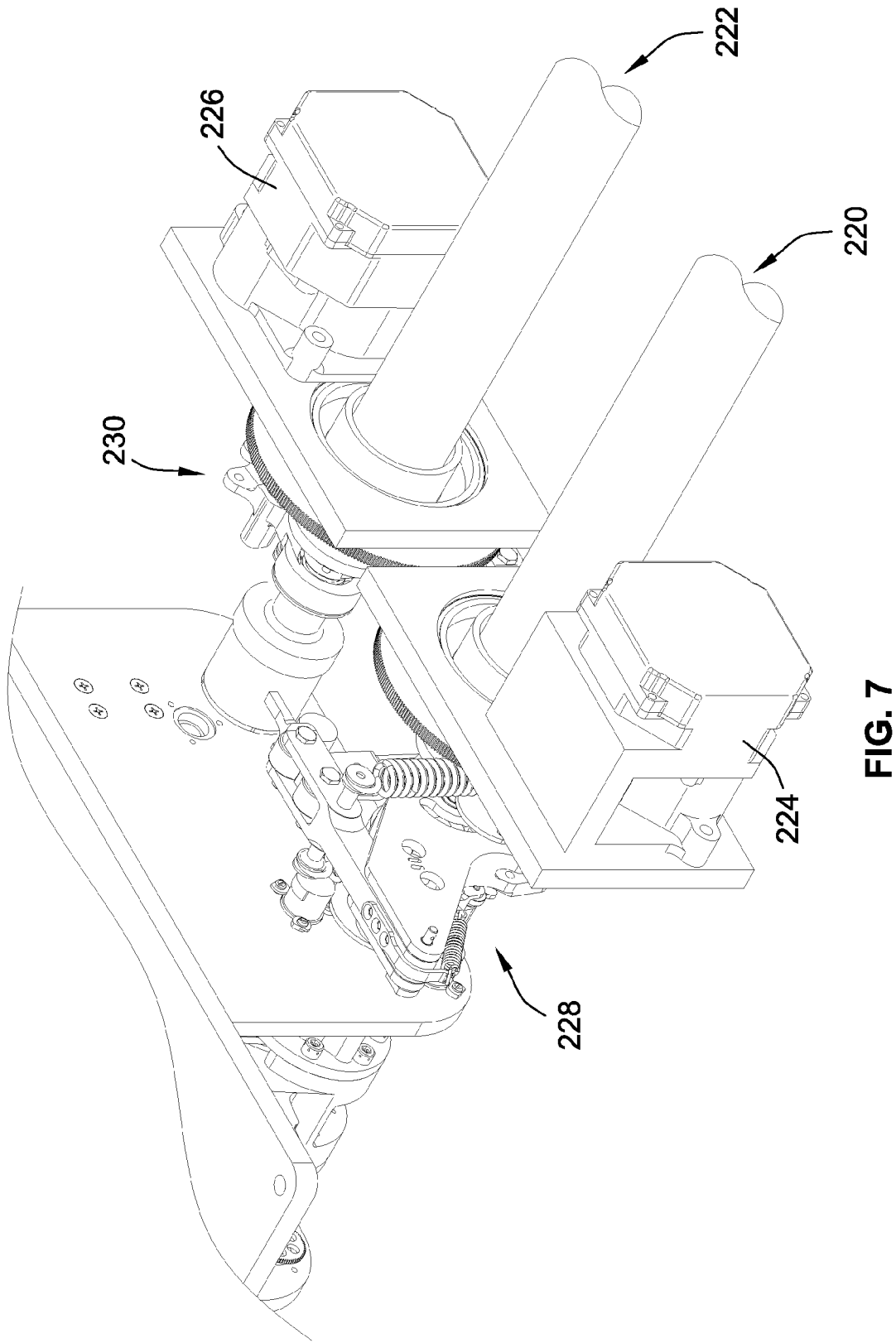
FIG. 7 is an enlarged view of the disconnect devices, torque tubes, and autopilot back drive arrangements of the system of FIG. 1.

With reference to FIGS. 1 and 7, in some embodiments, the yokes 102, 104 are coupled together for coordinated motion. As such, when a pilot manipulates one of the yokes 102 or 104, the other one of the yokes 104 or 102 is also moved. This provides a visual cue to the other pilot.

The arrangement for interconnecting the two yokes 102, 104 includes a pair of torque tubes 220, 222 for transferring torque between the respective hubs of the two yokes 102, 104.

The system also includes a pair of autopilot back drive arrangements. Each autopilot back drive arrangement includes an autopilot back drive actuators 224, 226 operably connected to drive the pitch and roll hubs 124, 154 of the yokes 102, 104 when in an autopilot mode. The manipulation of the yokes 102, 104 by the back drive actuators 224, 226 provides a visual cue to the pilots as to the current state of the control surfaces of the aircraft.

Additionally, the system includes a pair of disconnect devices 228, 230 configured to decouple the two yokes 102, 104 in the event of mechanical failure of one of the yokes 102, 104 that inhibits manipulation of the yokes 102, 104 to control the aircraft. The disconnect devices 228, 230 could be mechanically driven, electrically driven or both. Preferably, the disconnect devices 228, 230 can be reconnected from within the cockpit with the use of simple tools.

It is a feature of an embodiment of the system that the individual yokes are each line replaceable units including the chassis; pitch hub, roll hub; support column; control wheel; connection arrangement; pitch and roll centering/feel spring cartridges; and pitch and roll dampers.

Further, in some embodiments, the torque tubes are line replaceable units as well as the individual disconnect devices and the individual autopilot backdrive arrangements.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A line replaceable yoke for controlling the attitude of an aircraft, the yoke comprising:
   a chassis;
   a pitch hub rotatably mounted to the chassis for motion about a pitch axis;
   a roll hub rotatably mounted to the chassis for motion about a roll axis being generally parallel to the pitch axis;
   a support column attached to the pitch hub for rotational motion about the pitch axis with the pitch hub relative to the chassis;
   a control wheel pivotally attached to the support column proximate a first end of the support column for rotational motion about a control wheel pivot axis being generally perpendicular to the pitch axis and roll axis; and
   a connection arrangement coupling the control wheel to the roll hub configured to rotate the roll hub about the roll axis when the control wheel is rotated about the control wheel pivot axis.

2. The yoke of claim 1, further comprising:
   a pitch centering/feel spring cartridge operably coupled to the pitch hub for providing force feedback to the support column and oppose motion about the pitch axis; and
   a roll centering/feel spring cartridge operably coupled to the roll hub for providing force feedback to the control wheel and oppose motion of the roll hub about the roll axis.

3. The yoke of claim 2, wherein the pitch and roll centering/feel spring cartridges are bi-directional spring cartridges.

4. The yoke of claim 2, further comprising:
   a pitch clevis fixedly connected to the pitch hub and extending radially outward from the pitch axis, the pitch clevis connecting the pitch centering/feel spring cartridge to the pitch hub, a first end of the pitch centering/feel spring cartridge being attached to the pitch clevis at a location spaced away from the pitch axis, a second end of the pitch centering/feel spring cartridge, opposite the first end, being pivotally attached to the chassis but linearly grounded thereto; and
   a roll clevis fixedly connected to the roll hub and extending radially outward from the roll axis, the roll clevis connecting the roll centering/feel spring cartridge to the roll hub, a first end of the roll centering/feel spring cartridge being attached to the roll clevis at a location spaced away from the roll axis, a second end of the roll centering/feel spring cartridge, opposite the first end, being pivotally attached to the chassis but linearly grounded thereto.

5. The yoke of claim 4, further comprising:
   a pitch damper pivotally connected at a first end to the pitch clevis and pivotally connected at a second end to the chassis but linearly grounded thereto; and a roll damper pivotally connected at a first end to the roll clevis and pivotally connected at a second end to the chassis but linearly grounded thereto.

6. The yoke of claim 5, wherein the pitch and roll centering/feel spring cartridges are identical; and wherein the pitch and roll dampers are identical.

7. The yoke of claim 5, wherein the pitch and roll centering/feel spring cartridges are identical except for springs thereof; and wherein the pitch and roll dampers are identical except for gating or fluids thereof.

8. The yoke of claim 1, wherein the support column is pivotally attached to the pitch hub at a hinge having an axis of rotation that is generally parallel to the pitch axis;
further comprising a tension/compression force sensor connected at one end to the support column and at a second end to the pitch hub, the force sensor being offset from the hinge.

9. The yoke of claim 1, wherein the connection arrangement includes:
a drum attached to the control wheel for rotation about the control wheel pivot axis with the control wheel;
a cable having first and second ends operably attached to the roll hub and a central portion engaged with the drum;
a first pulley carried by the pitch hub, a first portion of the cable between the first end and the central portion engaging the first pulley;
a second pulley carried by the pitch hub, a second portion of the cable between the second end and the central portion engaging the second pulley.

10. The yoke of claim 9, wherein the roll hub includes:
a main hub rotatably supported by the chassis;
a first pulley rotatably attached to the main hub for rotation about the main hub, the first pulley attached to the first end of the cable such that tension in the cable applied to the first end causes the first pulley to rotate about the roll axis in a first direction;
a second pulley rotatably attached to the main hub for rotation about the main hub, the second pulley attached to the second end of the cable such that tension in the cable applied to the second end causes the second pulley to rotate about the roll axis in a second direction, opposite the first direction, the first and second pulleys being fixedly coupled together such that the first and second pulleys rotate together about the roll axis in both the first and second direction;
a scissor clevis including:
a first portion extending radially outward from the roll axis and fixedly attached to the first and second pulleys for rotation about the roll axis with the first and second pulleys having a connection end spaced radially outward from the roll axis;
a second portion extending radially outward from the roll axis and fixedly attached to the main hub for rotation about the roll axis with the main hub having a connection end spaced radially outward from the roll axis;
a tension/compression force sensor connected at a first end to the connection end of the first portion of the scissor clevis and connected at a second end to the connection end of the second portion of the scissor clevis.

11. The yoke of claim 5, wherein:
the connection arrangement includes:
a drum attached to the control wheel for rotation about the control wheel pivot axis with the control wheel;
a cable having first and second ends operably attached to the roll hub and a central portion engaged with the drum;
a first pulley carried by the pitch hub, a first portion of the cable between the first end and the central portion engaging the first pulley;
a second pulley carried by the pitch hub, a second portion of the cable between the first end and the central portion engaging the second pulley; and
the roll hub includes:
a main hub rotatably supported by the chassis;
a first pulley rotatably attached to the main hub for rotation about the main hub, the first pulley attached to the first end of the cable such that tension in the cable applied to the first end causes the first pulley to rotate about the roll axis in a first direction;
a second pulley rotatably attached to the main hub for rotation about the main hub, the second pulley attached to the second end of the cable such that tension in the cable applied to the second end causes the second pulley to rotate about the roll axis in a second direction, opposite the first direction, the first and second pulleys being fixedly coupled together such that the first and second pulleys rotate together about the roll axis in both the first and second direction;
a scissor clevis including:
a first portion extending radially outward from the roll axis and fixedly attached to the first and second pulleys for rotation about the roll axis with the first and second pulleys having a connection end spaced radially outward from the roll axis;
a second portion extending radially outward from the roll axis and fixedly attached to the main hub for rotation about the roll axis with the main hub having a connection end spaced radially outward from the roll axis;
a tension/compression force sensor connected at a first end to the connection end of the first portion of the scissor clevis and connected at a second end to the connection end of the second portion of the scissor clevis.

12. The yoke of claim 11, wherein the chassis; pitch hub, roll hub; support column; control wheel; connection arrangement; pitch and roll centering/feel spring cartridges; and pitch and roll dampers form a complete line replaceable unit.

13. A yoke system for controlling the attitude of an aircraft, the yoke system comprising:
first and second yokes, each yoke including:
a chassis;
a pitch hub rotatably mounted to the chassis for motion about a pitch axis;
a roll hub rotatably mounted to the chassis for motion about a roll axis being generally parallel to the pitch axis;
a support column attached to the pitch hub for rotational motion about the pitch axis with the pitch hub relative to the chassis;
a control wheel pivotally attached to the support column proximate a first end of the support column for rotational motion about a control wheel pivot axis being generally perpendicular to the pitch axis and roll axis;
a connection arrangement coupling the control wheel to the roll hub configured to rotate the roll hub about the roll axis when the control wheel is rotated about the control wheel pivot axis;
a pitch torque tube operably coupling and transmitting torque between the pitch hubs of the first and second yokes for coordinated rotational motion;

a roll torque tube operably coupling and transmitting torque between the roll hubs of the first and second yokes for coordinated rotational motion.

14. The yoke system of claim 13, wherein each yoke and each torque tube are individual line replaceable units.

15. The yoke system of claim 13, further comprising:
a pitch autopilot feedback arrangement including a pitch actuator operably coupled to the pitch torque tube and configured to operably drive the pitch hubs of the first and second yokes to manipulate the support columns of the first and second yokes to provide pitch autopilot visual feedback;
a roll autopilot feedback arrangement including a roll actuator operably coupled to the roll torque tube and configured to operably drive the roll hubs of the first and second yokes to manipulate the control wheels of the first and second yokes to provide roll autopilot visual feedback.

16. The yoke system of claim 13, further comprising:
a pitch disconnect device having a disconnected state, in the disconnected state, the pitch disconnect device is configured to mechanically disconnect the pitch hub of the first yoke from the pitch hub of the second yoke so that the support columns of the first and second yokes can be manipulated independently from one another; and
a roll disconnect device having a disconnected state, in the disconnected state, the roll disconnect device is configured to mechanically disconnect the roll hub of the first yoke from the roll hub of the second yoke so that the control wheels of the first and second yokes can be manipulated independently from one another.

* * * * *